June 20, 1944.  R. ANSCHÜTZ ET AL  2,351,897
TYPEWRITER-CALCULATING MACHINE
Filed Jan. 18, 1939  9 Sheets-Sheet 1

Inventors,
R. Anschütz &
A. Merz
By: Glascock Downing & Seebold
Attys.

June 20, 1944.    R. ANSCHÜTZ ET AL    2,351,897
TYPEWRITER-CALCULATING MACHINE
Filed Jan. 18, 1939    9 Sheets-Sheet 5

Inventors
R. Anschütz,
& H. Merz,
By Glascock Downing & Seebold
Attys.

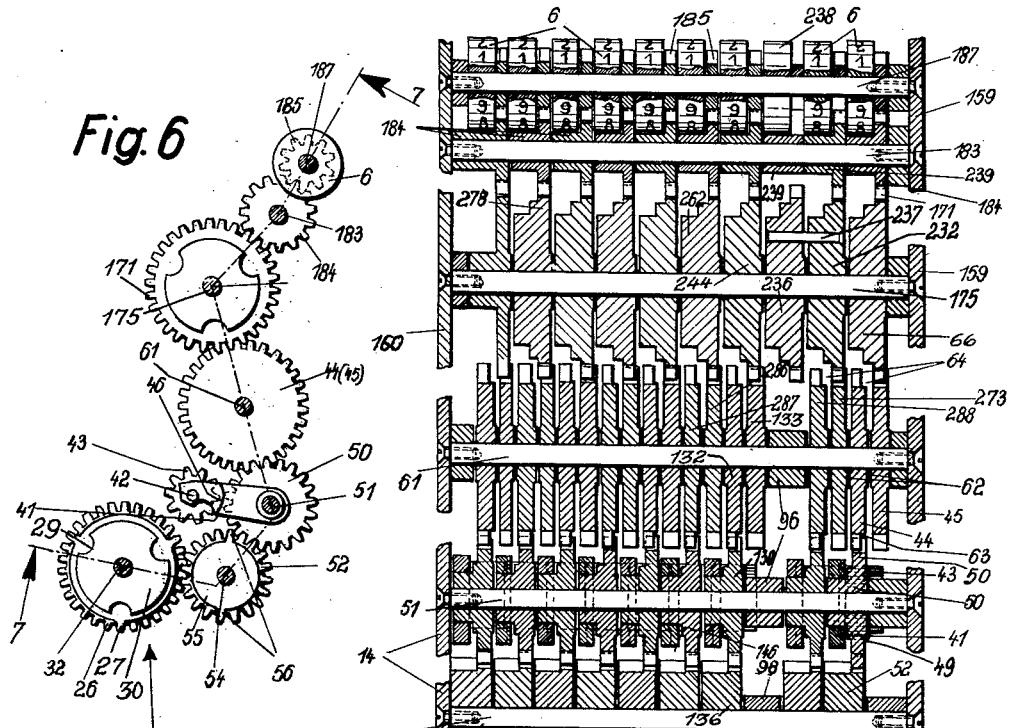
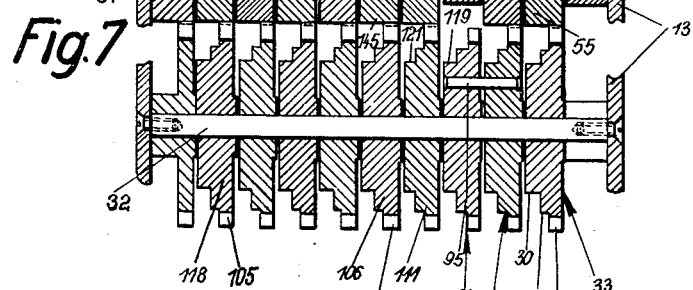
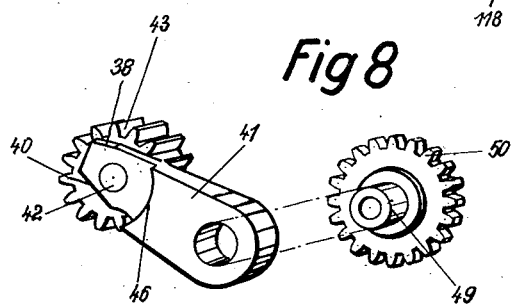
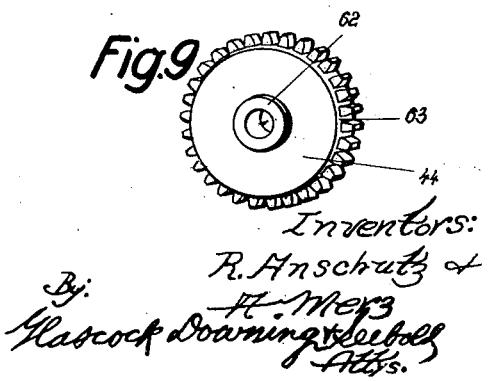

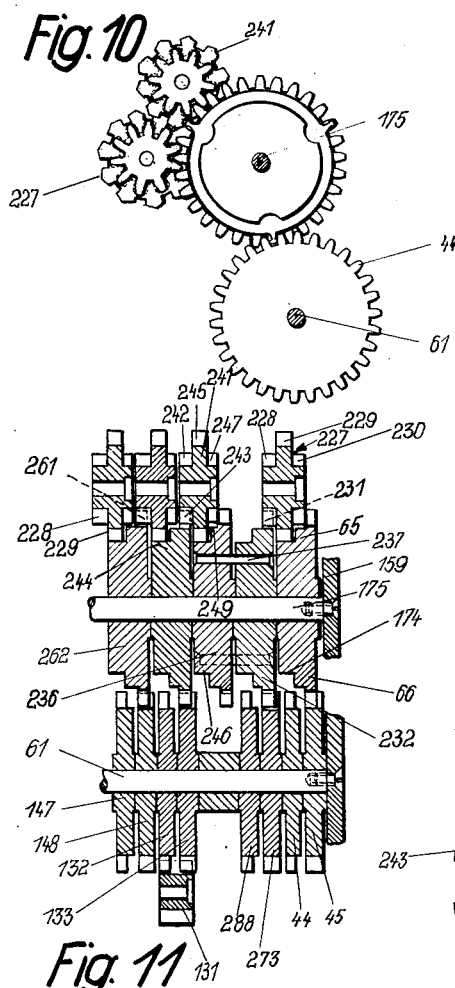

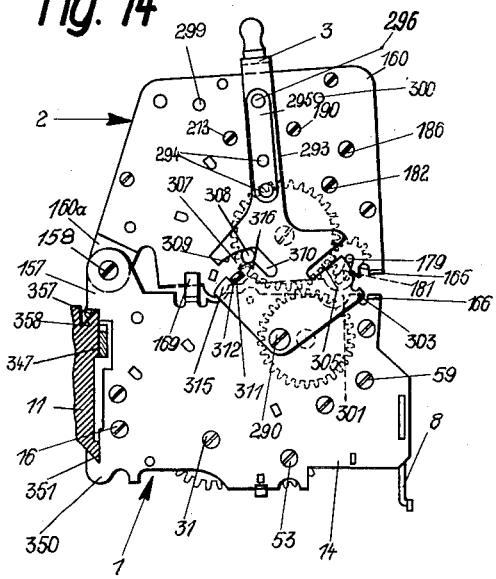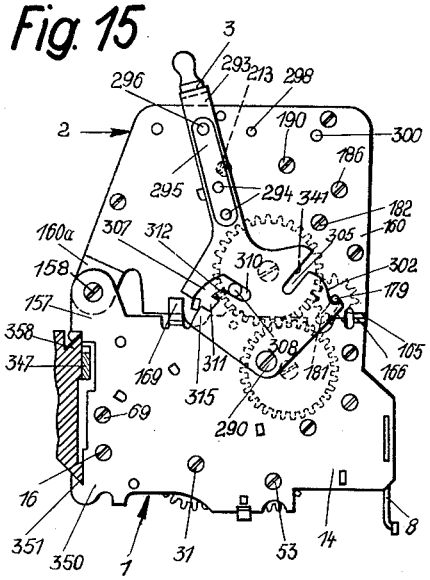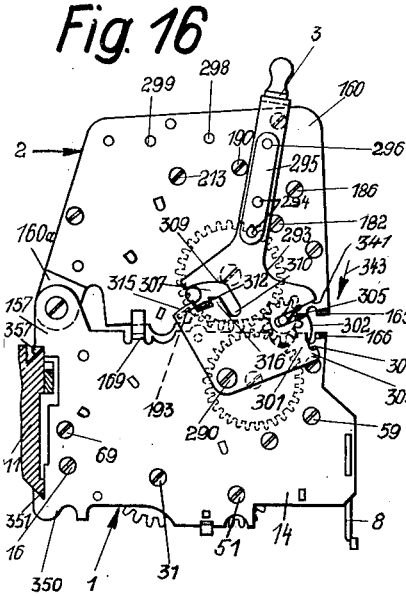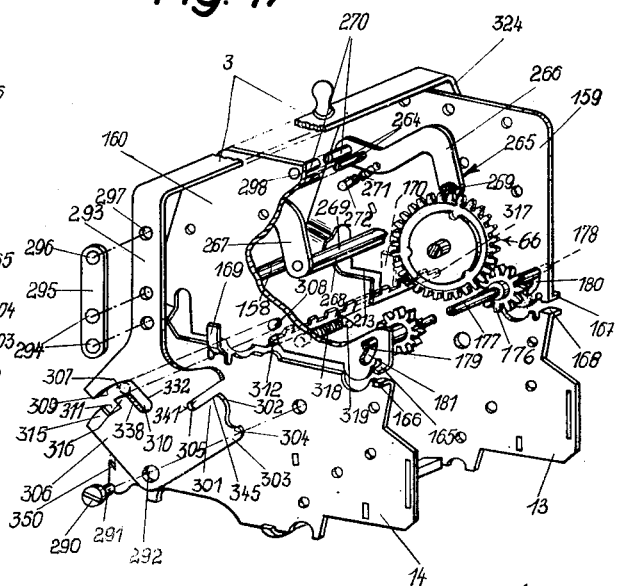

June 20, 1944. R. ANSCHÜTZ ET AL 2,351,897
TYPEWRITER-CALCULATING MACHINE
Filed Jan. 18, 1939 9 Sheets-Sheet 9
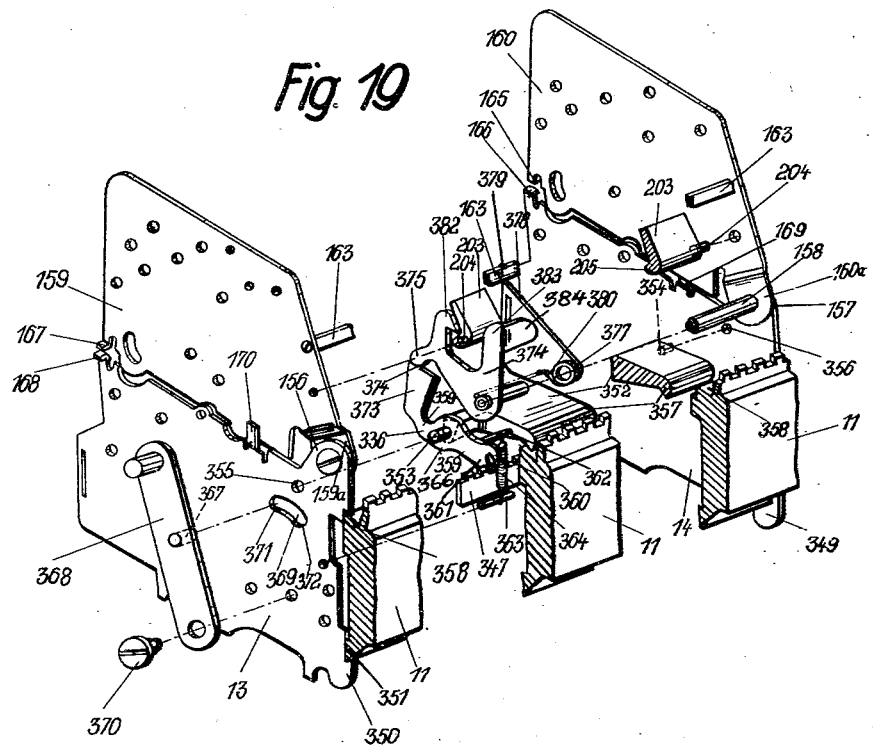
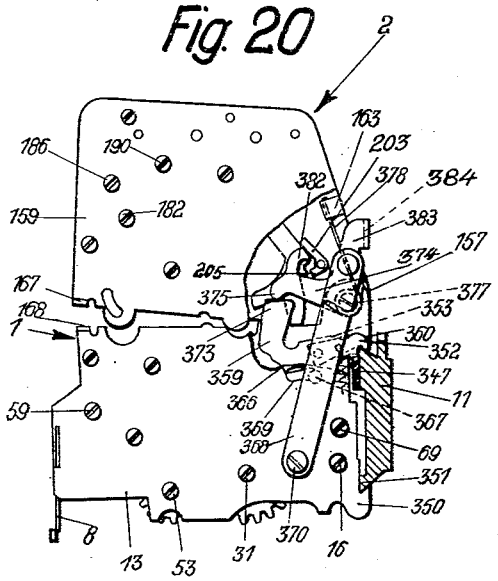
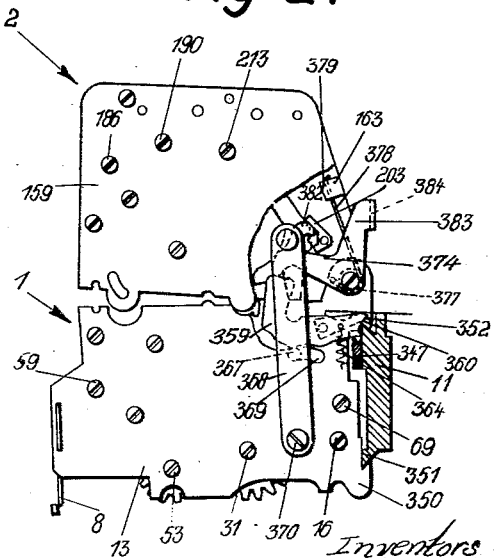

Patented June 20, 1944

2,351,897

UNITED STATES PATENT OFFICE 2,351,897

TYPEWRITER-CALCULATING MACHINE

Robert Anschütz and August Merz, Zella-Mehlis, Germany; vested in the Alien Property Custodian Application January 18, 1939, Serial No. 251,634
In Germany January 10, 1938

15 Claims. (Cl. 235—59)

This invention relates to typewriting-calculating machines with total taking mechanism, and to similar machines.

According to the invention, any or all of the column totalizers in a machine of the class specified are combined with accumulators or summing-up devices, and each accumulator is arranged to be selectively coupled with the corresponding column totalizer. The units comprising a totalizer and its accumulator, will be referred to as "double totalizers."

By these means, values which have been introduced into the column totalizers, are stored in the corresponding accumulator for later use, so that calculations involving accumulation of values, are easy and simple.

In the accompanying drawings, an accounting machine to which the invention has been adapted, is illustrated partly by way of example.

In the drawings

Fig. 2 shows the accumulator uncoupled from the totalizer.

Fig. 3 shows the two parts coupled in such manner that the accumulator is operated subtractively upon additive operation of the column totalizer.

Fig. 4 shows the parts coupled in such manner that the accumulator is operated additively upon additive operation of the column totalizer.

Fig. 6 shows part of a train of gears in the hundredths denomination connecting the totalizer and the accumulator.

Fig. 7 is a section through all calculating denominations of the double totalizer on the line 7—7 in Fig. 6, viewed in the direction of the arrows, the axes of all gears being shown in a vertical plane.

Figs. 8 and 9 are perspective details relating to Fig. 7.

Figs. 10 and 12 show details of the train of gears illustrated in Fig. 7.

Figs. 11 and 13 are, respectively, sections through the axes to the gears in Figs. 10 and 12, the axes being again shown in a vertical plane.

Figs. 14, 15 and 16 are elevations of the double totalizer, viewed from the left in Fig. 1 and showing its manipulating handle in three distinct positions.

Fig. 17 is a perspective illustration of the accumulator, with its casing partly broken open.

Fig. 18 is a detail relating to Fig. 17, shown in perspective and drawn to a larger scale.

Fig. 19 is a perspective illustration showing the side walls of the double totalizer, and part of its mechanism viewed from the right rear.

Figs. 20 and 21 are elevations of the double totalizer, viewed from the right in Fig. 1 and showing two distinct positions of the means for securing the double totalizer to the totalizer suspension rail of the paper carriage.

(1) General description

Figure 1:
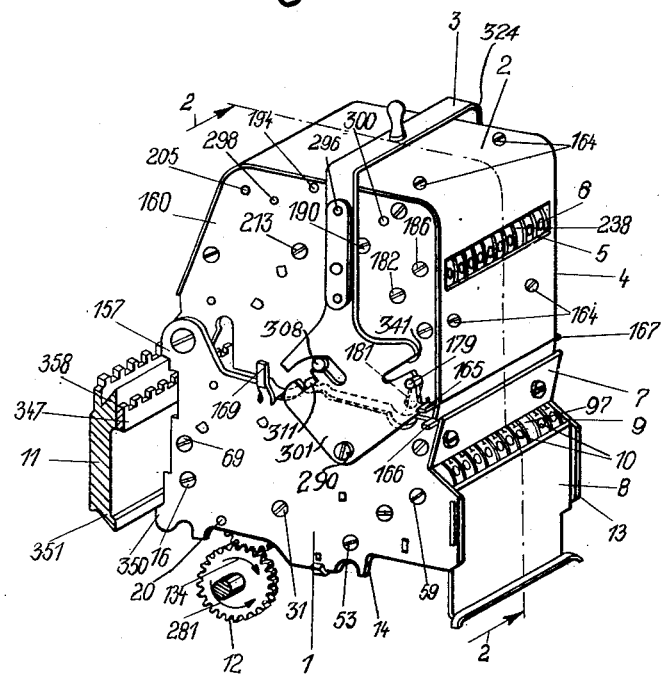
Fig. 1 is a perspective illustration, viewed from the front and the left, of a double totalizer comprising a column totalizer mounted on the totalizer suspension rail of the paper carriage, and the accumulator allotted to the column totalizer.

The column totalizer 1 and the accumulator 2 together constitute a double totalizer.

In the example illustrated, the accumulator 2 is superposed upon and is mounted to swing in a vertical plane at the top of the column totalizer 1, to be coupled with and uncoupled from the column totalizer 1. By a U-shaped manipulating lever 3 the accumulator 2 can be coupled with the column totalizer 1, and the species of the accumulator 2 can be set preliminarily by manipulation of the same lever.

The cover 4 of the accumulator 2 is slotted at 5 to display number wheels 6 forming part of the accumulator 2. The numbers "0" to "9" are placed on the wheels in anti-clockwise sequence. The cover 7 and a controlling plate 8 of the column totalizer 1 define a slot 9 displaying number wheels 10 forming part of the column totalizer 1 on which are also placed the numbers "0" to "9" in anti-clockwise sequence.

The means for securing the column totalizer 1 to the totalizer suspension rail 11 of the paper carriage, not shown, of the accounting machine on which it is suspended will be fully described in section 15 "The suspension and securing means for the column totalizer and the accumulator" with reference to Figs. 19, 20 and 21.

(2) The arrangement of the mechanism in the column totalizer

Figure 2:
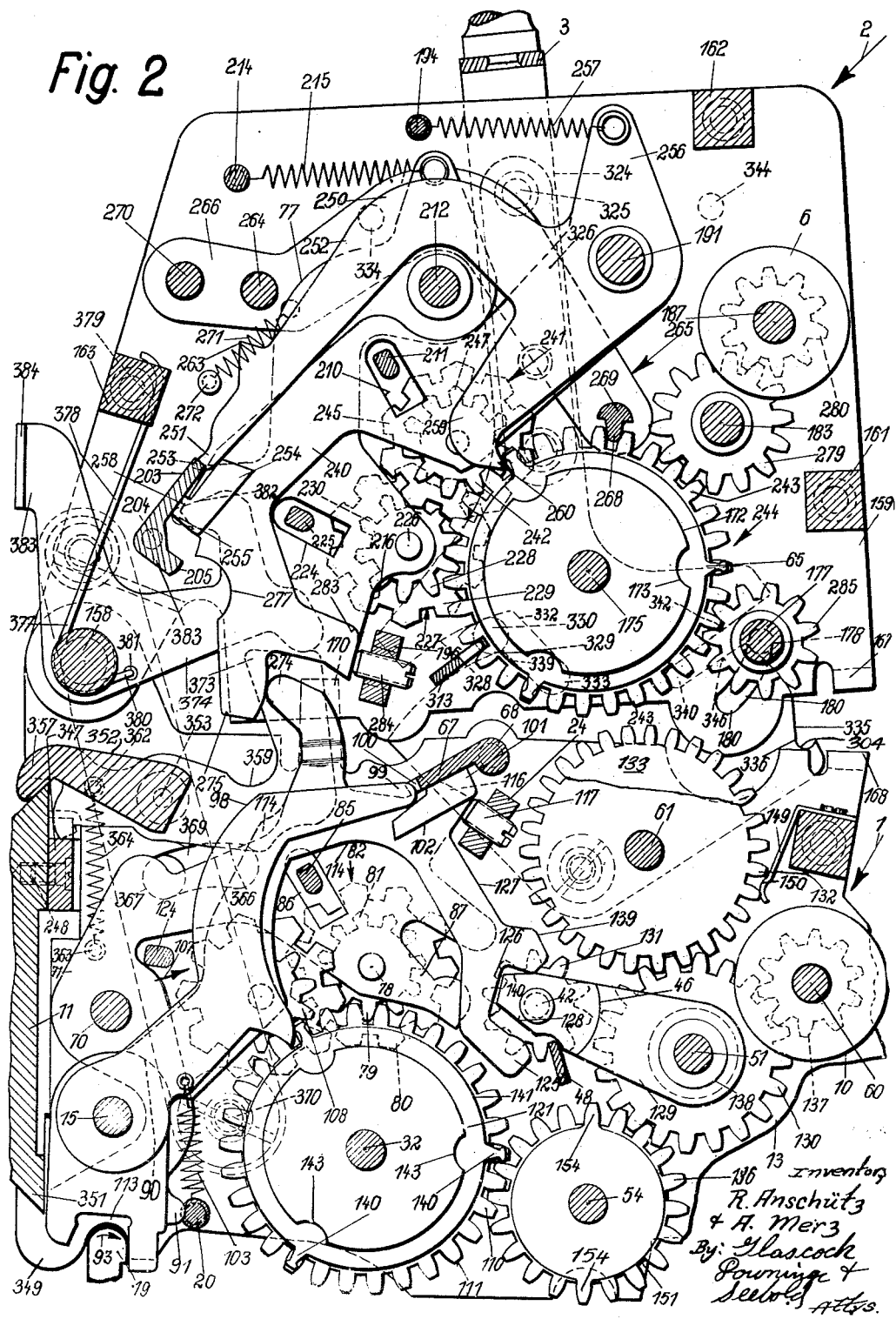
Figs. 2, 3 and 4 are sectional elevations taken on the line 2—2 in Fig. 1 and drawn to a larger scale.

Referring now to Figs. 1 and 2, a bar 15 extends through the frame of the column totalizer 1 and is held against its side plates 13 and 14 by screws 16. A locking lever 17 (Fig. 5) is mounted to swing on the bar 15 for the hundredths denomination of the column totalizer 1.

At its rear end, this locking lever 17 has a fork 18 and when the locking lever of the hundredths denomination of the column totalizer 1 moves into active position relatively to the master wheel 12, a releasing finger 19 whose upper end is shown in Fig. 2, engages in the fork for preparing the corresponding denomination for a calculating operation. A spring 21 whose upper end is attached to the locking lever 17 and whose lower end is anchored to a rod 20 secured in the side plates 13 and 14 of the column totalizer 1, tends to turn the locking lever 17 clockwise about the bar 15. The normal position of the locking lever 17 is defined by an abutment 22 on the locking lever 17 bearing against an adjustable screw 23 in a transverse bar 24 which is secured between the two side plates 13 and 14 of the vertical totalizer 1.

In this normal position, a tooth 25 on the locking lever 17 engages in any tooth space between the teeth of a spur gear 26. The spur gear 26 is mounted to rotate on a shaft 32 which is secured to the side plates 13 and 14 by screws 31. It is equipped with three tens-transfer teeth 27 and a flange 30 which has a semi-cylindrical recess 29 opposite each tens transfer tooth 27. The arrangement of the spur gear on the shaft 32 is best seen in Fig. 7. The spur gear will be referred to as the "main driving wheel 33."

The locking lever 17 is equipped with a tooth 34 positioned between the bar 15 and the abutment 22 for cooperation with a locking lever in the accumulator 2, as will be described in section 6, "The arrangement of the mechanism in the totalizer." In the present instance, this is the locking lever of the hundredths denomination in the accumulator 2.

An extension 35 of the locking lever 17 beyond the abutment 22 is forked at 36 and has prongs 37 and 39 cooperating, respectively, with inclines 38 and 40, Fig. 8, on the upper and lower edges, respectively, of the free end of a coupling arm 41 journaled on the projecting hub 49 of a gear 50 rotatable on a shaft 51, as hereinafter explained.

Mounted to rotate on a rivet 42 in the free end of the coupling arm 41 is a coupling gear 43. A shaft 61 is secured in the end plates 13 and 14 of the column totalizer 1, and on it pairs of transmission gears 44, 45, Fig. 7, are mounted for free rotation. The width of each coupling gear 43 is equal to the overall width of a pair of transmission gears 44 and 45, so that the coupling gear engages and connects the two otherwise freely rotatable transmission gears 44, 45 of a pair.

The left-hand side of the coupling arm 41 is recessed at 46 for the reception of another coupling gear which is similar to the gear 43, but is allotted to the next higher denomination of the column totalizer 1. In the normal position of the coupling arm 41, the coupling gear 43 rests on a locking bar 48, Fig. 2, which is secured in the side plates 13 and 14 of the column totalizer 1 and, by engaging between adjacent teeth of the gear 43, holds the coupling arm 41 against swinging anti-clockwise about the shaft 51, preventing unintentional rotation of the coupling gear 43 in its inactive position.

The coupling arm 41 is not mounted directly on the shaft 51 but is seated on the hub 49 of an intermediate gear 50, Fig. 8, which in turn is mounted to rotate on the shaft 51. The hub or distance sleeve 49 bridges the distance to the next higher place, as shown in Fig. 7. It will be understood that in this manner the coupling arm 41 and the sleeve 49 can turn independently of each other.

The intermediate gear 50 meshes with a zero setting gear 52 which is mounted for free rotation on a shaft 54, secured to the side plates 13 and 14 by screws 53. The zero setting gear 52 is made integral with zero setting disc 55 which has two zero setting teeth 56, for cooperation with the usual zero stop 57, Fig. 5. The zero setting gear 52 also meshes with the teeth 26 of the main driving wheel 33.

Figure 5:
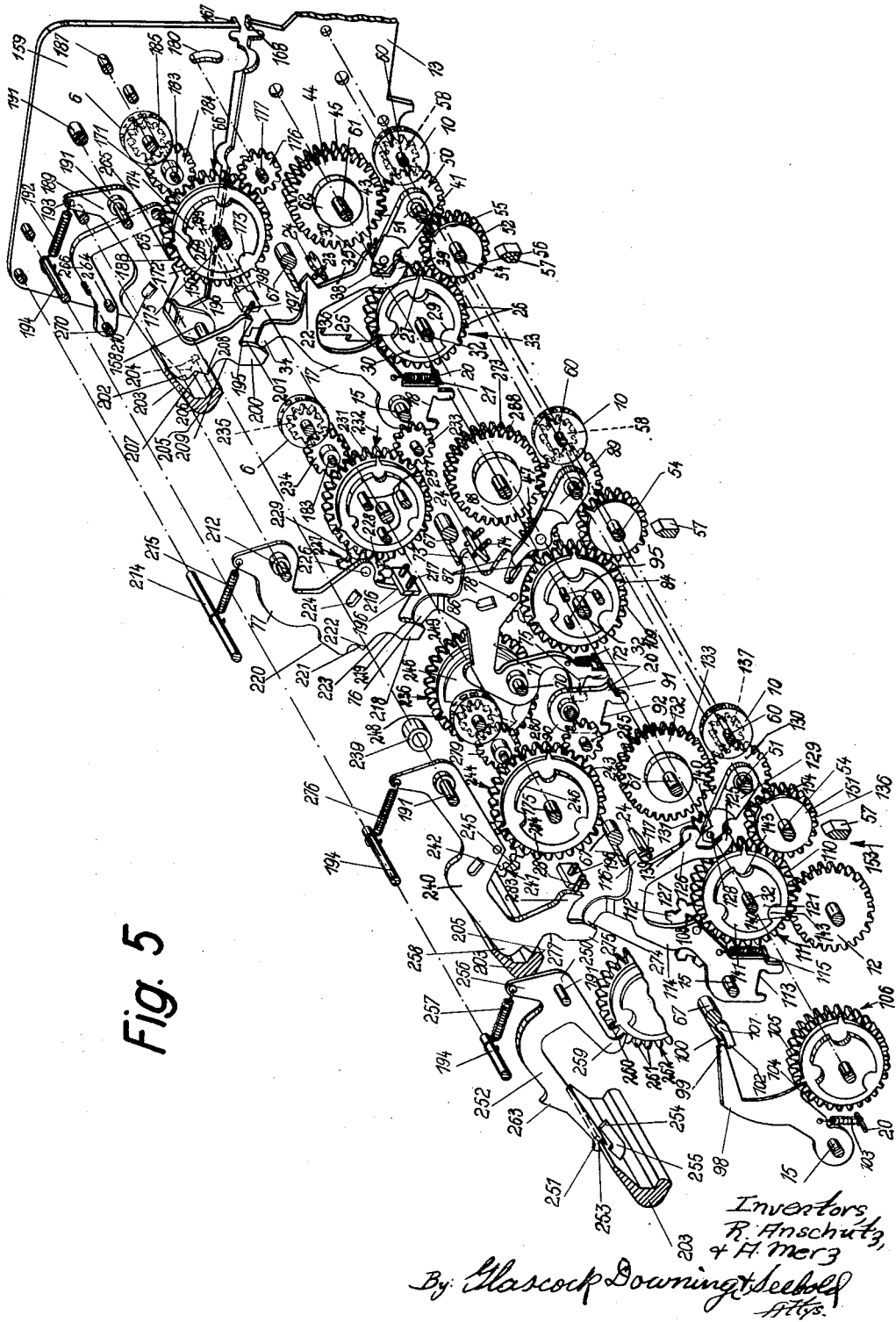
Fig. 5 is a perspective illustration of the mechanisms at the three lowermost denominations and the comma place, viewed from the front and the left, parts being shown at a distance from each other for the sake of clearness.

The number wheel 10 of the hundredths denomination is provided with a zero setting gear 58, Fig. 5, meshing with the spur gear 52. The number wheel 10, with its spur gear 58, is mounted to rotate freely on a shaft 60 which is secured in the side plates 13 and 14 of the column totalizer 1 by screws 59.

The intermediate gear 50, meshes with the transmission gear 44 on the shaft 61. The corresponding transmission gear 45 is mounted at the right of the gear 44. If the gears 44 and 45 are not in active position relatively to the master wheel, the same are free to rotate quite independently of each other, so that any tens transfer in the column totalizer 1 is performed independently of the accumulator 2, and vice versa. Transfer of values is only possible from the column totalizer 1 to the accumulator 2 when the corresponding driving gear, say 26, is engaged with the master wheel 12, at which time only are the transmission gears 44, 45 connected by the wide coupling spur gear 43 on the arm 41 to rotate as a unit.

The transmission gears 44 and 45 are spaced apart by their bosses 62 extending beyond the bodies of the gears, as shown in Fig. 9, and the teeth of gears 44 are narrower than the thickness of their bodies, so that a free space 63 is formed at one side. The clearance made up by the bosses 62 and the set-back of the teeth at 63 is indicated by 64 in Fig. 7 and is provided to afford clearance for the tens transfer teeth 65, Fig. 5, on the accumulator driving wheels 66 journaled on the shaft 115 of the accumulator 2, as will be fully described in section (6).

A flap 67 (Fig. 5) extends transversely above all of the ten calculating denominational drive wheels 26, etc. in the column totalizer 1 and is mounted in the side plates 13 and 14 by trunnions 68 for cooperation with the abutments 22, etc.

A shaft 70 is secured in the side plates 13 and 14 of the column totalizer 1 by screws 69. On this shaft 70, a locking-wheel lever 71, Fig. 5, somewhat similar to the locking lever 17, is arranged at that decimal place of the column totalizer 1 which is the next higher from the hundredths denomination, to swing about the shaft. A spring 72 which is attached to the locking-wheel lever 71 at one end, and anchored to the rod 20 at the other, tends to turn the lever 71 clockwise about the shaft 70, and its normal position is defined by an abutment 73 on the lever engaging an adjustable screw 74 in the transverse bar 24. The abutment cooperates with the flap 67.

A fork 75 at the rear end of the locking-wheel lever 71 is arranged to cooperate with the releasing finger 19, Fig. 2 when the decimal gear 84 of the column totalizer 1 moves into engagement with the master wheel 12. The finger 19 releases the corresponding calculating gear train for a calculating operation.

A tooth 76 on the locking-wheel lever 71 which corresponds to the tooth 34 of the locking lever 17 at the hundredths denomination, is bent to the right for a distance equal to the space between adjacent denominational orders to cooperate with a locking lever 77 in the accumulator 2, as will be described in section (6).

A transmitting pinion 79, Figs. 2 and 13, a Maltese gear 80 and a receiving pinion 81 are journaled to turn together on a stud 78 projecting laterally from the locking wheel lever 71. The parts 79, 80 and 81 together constitute the usual locking and tens transfer wheel and the unit will be referred to as the locking wheel 82. The transmitting pinion 79 of the locking wheel 82 of the tenths decimal place meshes with the teeth 83 of the driving wheel 84 which is allotted to the tenths decimal place of the column totalizer 1, said wheel 84 corresponding to the main driving wheel 33 of the hundredths calculating place.

The Maltese wheel portion 80 of this locking wheel 82 bears on the flange 30 of the main driving wheel 33 of the hundredths denomination; and the receiving pinion 81 of the locking wheel 82 is engageable by the tens-transfer teeth 27 of the main driving wheel 33 of the hundredths order.

A stationary locking bar 85 (Fig. 2) extends through a slot 86 in the locking-wheel lever 71 and is secured in the side walls 13 and 14. In the normal inactive position of the totalizer, one of the tooth spaces between the teeth of the Maltese gear 80 of the locking wheel 82 of the tenths decimal place engages over the locking bar 85, as shown in Fig. 2.

A forked member 87 (Fig. 5) of the locking-wheel lever 71 engages the free end 88 of a coupling arm 89, as best seen in Fig. 5. The coupling arm 89 and the coupling gear 47 which is mounted to turn on it, correspond as to their arrangement, to the coupling arm 41 and its coupling gear 43 for the hundredths denomination. As plainly shown in Fig. 5, the train of gears allotted to the hundredths decimal place and comprising the gears 33, 52, 43, 50, 58, 10, 44 and 45 is similar to the gear train for the tenths decimal place and these parts of the tenths decimal place will not be detailed.

In the next higher, or comma, place of the column totalizer 1, a calculating operation must not occur. To prevent a calculating operation, a forked comma locking member 90, Figs. 2 and 5, forked at the lower end 92 is provided on the fulcrum shaft 15 of the column totalizer 1 the forward prong 91 of which abuts against the rod 20. When the comma space arrives at the printing point, the finger 19 engages in this fork 92 and cannot rock in the direction of the arrow 93 in Fig. 2, since the prong 91 bears against the rod 20 and arrests the comma locking member, so that no calculating operation can be started in the column totalizer.

It will be necessary to effect a tens transfer from the tenths decimal place of the column totalizer 1 to the units of dollars denomination of the column totalizer. For this purpose, the main driving wheel 84, as shown in Fig. 7, which is allotted to the comma place, is connected to the main driving wheel 84 of the tenths decimal calculating place by rivets 95 so that the main driving wheels 84 and 84 act as a unit.

In the comma place, instead of the trains of gears allotted to all calculating orders of the column totalizer 1, spacers 96 and 98, Fig. 7, are inserted on the corresponding shafts 51 and 54 of the totalizer, and a blank roller 97 is arranged on the shaft 60, Fig. 1, instead of a number wheel 10.

The mechanisms described for the hundredths and tenths decimal places of the column totalizer 1, as shown in Fig. 5, are also allotted alternately to the next higher calculating denominations that is, the units, tens, hundreds, etc., decimal places. The arrangement of these parts will therefore not be detailed. It should be noted, however, that the locking levers of the units calculating decimal places etc., are equipped with a unit locking wheel as wheel 82 in the tenths decimal place (Fig. 13).

At the left of the units of dollars calculating denomination, a lever 98, as best seen in Figs. 2 and 5, is mounted to swing on the shaft 15. Its upper end 99 extends forwardly and into a notch in the flap 67 at 100. The rearwardly extending arm 102 of a holding member 101 attached to the flap 67, projects below the end 99 of the lever 98. A spring 103 which is attached to the lever 98 at one end, and anchored on the rod 20 at the other, tends to turn the lever 98 clockwise about the shaft 15 to cause the end 99 of the lever 98 to exert pressure on the arm 102 at the rear end of the holding member 101 of the flap 67, to hold the flap yieldingly at its limit of counterclockwise travel. In consequence, the flap 67 bears on the abutments 22 and 73 of the respective locking and locking-wheel levers 17 and 71 allotted to the several calculating orders of the column totalizer. This is the normal position of the flap 67 which, in turn, holds the lever 98 in its normal position wherein a locking tooth 104 on the lever 98 engages in that tooth space between the teeth 105 of the main driving wheel 106 of the tens denomination which is presented to the locking tooth at the time. By these means, the slack of the main driving wheels 33, 84 etc. produced by their cooperation with the tens transfer and locking wheels 82, 107 and so on, and in the connected trains of gears at the individual denominations of the column totalizer 1, is taken up.

The arrangement of such a lever 98 and the parts co-operating therewith has also been selected at the left of the eighth calculating denomination place or ten thousands order.

(3) *The operation of the column totalizer when a value is introduced*

The operations which are performed when a value is introduced into the column totalizer 1, are substantially similar in the individual calculating orders, and therefore only the introduction of a value into the units of dollars calculating order of the column totalizer 1 will be described by way of example.

When the transmitting pinions 79, 108, etc., of the locking wheels 82, 107 etc., of the individual calculating denominations engage in the teeth of the main driving wheels 84, 111 etc. of next higher order, (Fig. 2), the main driving wheels 84, 111 cannot be rotated. Unintentional rotation of each individual main driving wheel 33, 84, 111 etc., is prevented by the teeth of the Maltese wheel 80, 112 of the locking wheels 82, 107 etc., which bear on the flange 30, 119 of the main driving wheel 83, 84, 111 etc. of the next lower calculating denomination.

Figure 3:
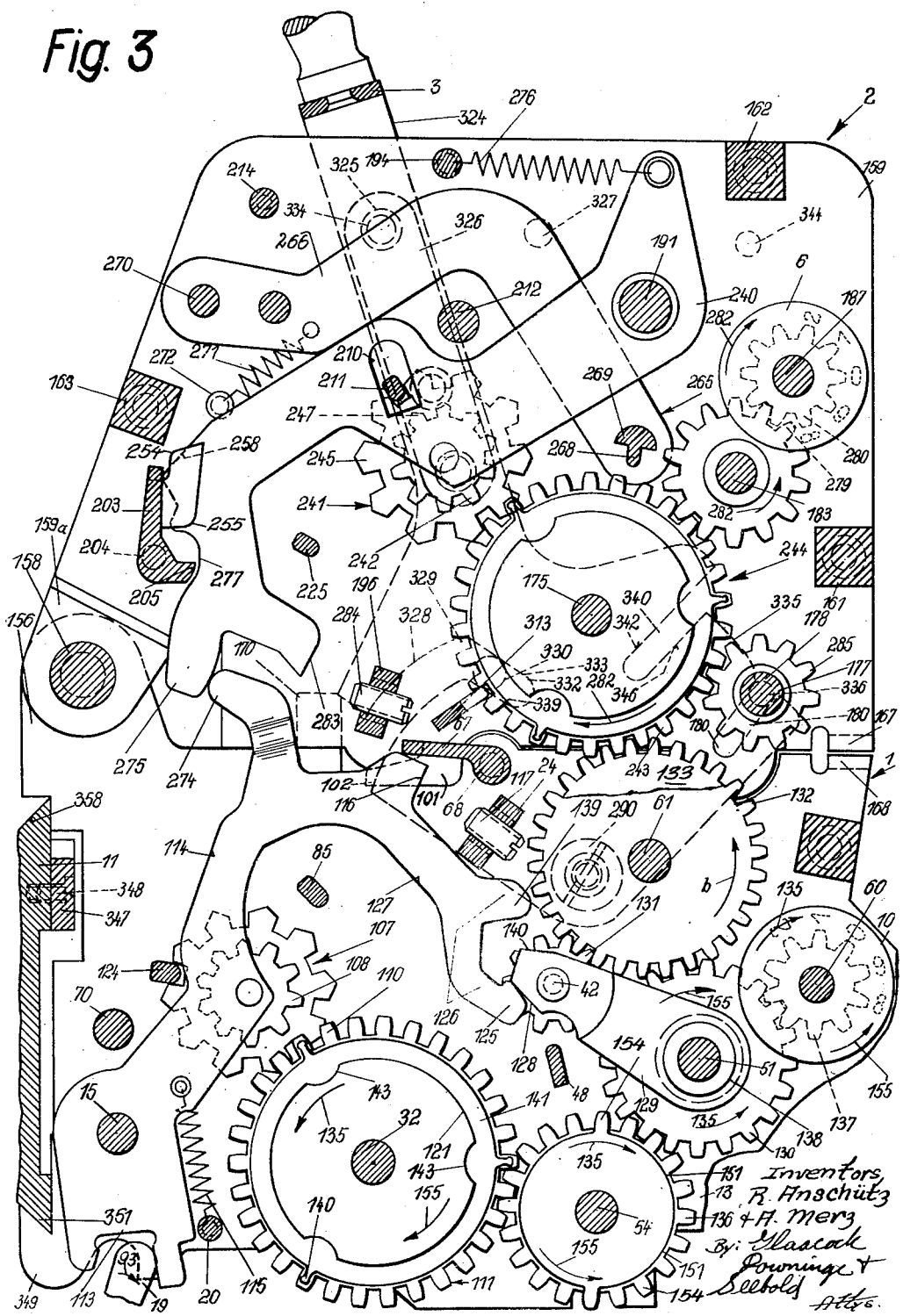

After the units of dollars denomination of the column totalizer 1 has moved into active position with relation to the master wheel 12, and the well known calculating key—not shown—for the value to be introduced has been depressed, the releasing finger 19 is turned in the direction of the arrow 93, and, since it projects into the fork 113 of the locking lever 114 allotted to the units of dollars denomination, it swings the locking lever 114 anti-clockwise about the bar 15, Fig. 3, against its spring 115. At the same time, the abutment 116 of the locking lever 114 is lifted clear of the screw 117 in the stationary bar 24 to rock the flap 67 clockwise about its trunnions 68. The arms 102 of the holding members 101 secured to the flap 67 act on the arms 99 of the two levers 98 Figs. 3 and 5, only one lever 98 being illustrated, and swing the levers 98 anti-clockwise about the bar 15 against their springs 103 to disengage the locking teeth 104 of the levers 98 from the teeth 105 of the main driving wheels 106 and 118 (Fig. 7) so that these are free to turn. Also the locking wheel 107, Fig. 13, of the locking lever 114 partakes in its anti-clockwise movement, and the transmitting pinnion 108 of this locking wheel 107 clears the teeth 110 of the units of dollars main driving wheel 111. At the same time, the Maltese wheel 112 is withdrawn from the flange 119 of the main driving wheel 94 of the comma place, and, since the flange 121 (Fig. 7) of the main driving wheel 111 of the units of dollars denomination can rotate freely past the teeth of the Maltese wheel 122 of the locking wheel 123 of the next higher denomination, that is, the tens of dollars denomination, the main driving wheel 111 of the units of dollars denomination can be turned by the master wheel 12.

When the locking lever 114 of the units of dollars order has been swung anti-clockwise by the release finger 19, one of the tooth spaces of the Maltese wheel 112 of the locking wheel unit 107 engages the stationary bar 124 and thus prevents rotation of the locking wheel 107 on the said locking lever 114.

When the locking lever 114 of the units of dollars order is swung anti-clockwise, the prong 125 (Figs. 2-5) of the fork 126 at the end of the arm 127 of the locking lever 114 engages the edge 128 of the coupling arm 129 at the units of dollars order a short time after the locking lever has started and swings the coupling arm 129 clockwise about the hub 138 of the corresponding spur gear 130 to disengage the coupling gear 131 on the arm 129 from the locking bar 48. When the coupling arm 129 has completed its clockwise movement the coupling gear 131, as shown in Fig. 11 meshes with the pair of transmission wheels 132, 133 at the units order.

The value is now introduced into the column totalizer 1, and the master wheel 12 is rotated in the direction of the arrow 134 (Fig. 1) through an angle corresponding to the value introduced. Since the master wheel 12 meshes with the teeth 110 of the main driving wheel 111 of the units of dollars order, this wheel is rotated in the direction of the arrow 135 in Fig. 3, and transfers the value to the wheels 136, 130 and 137 which rotate in the directions of the arrows 135 in Fig. 3. The number wheel 10 of the units of dollars order partakes in the rotation of its gear 137 in the direction of the arrow 14, and displays the value at the inspection opening 9 in the cover plate 1 of the column totalizer 1. The transmission of the rotation of the intermediate gear 130 to the corresponding transmission gear 132 and to the accumulator 2 through the twin gears 131 and 133 will be described in section (6).

When the value has been introduced, the releasing finger 19, returns into its initial position, as shown in Fig. 2, and releases the locking lever 114 whose abutment 116 now is returned against the screw 117 in the bar 24 by its spring 115. At the same time, the abutment 116 releases the flap 67 and, through parts 99, 101 and 102, the levers 98 return into their initial positions, Fig. 2, under the pull of their springs 103. Their teeth 104 now re-engage between the teeth 105 of the allotted main driving wheels 106 and 118.

The locking wheel 107 of the locking lever 114 at the units of dollars order partakes in the return of this lever into its normal position and the transmitting gear portion 108 engages in the teeth 110 of the main driving wheel 111 of the units dollars order. The Maltese portion 112 of this locking wheel 107 re-engages the flange 119 of the main driving wheel 94 at the comma place, and locks the main driving wheel 111 against rotation.

When the locking lever 114 returns, the prong 125 of its fork 126 releases the edge 128 of the coupling arm 129 of the units dollars orders which now swings about the hub 138 of the intermediate gear 130 by gravity. When the locking lever 114 has about completed its return, the prong 139 of the fork 126 re-engages the edge 140 of the coupling arm 129, to insure the engagement of the coupling gear 131 with the stationary locking bar 48.

The operations performed in the units dollars orders are now completed, the value is typed on the paper supported by the paper carriage, and the carriage is advanced another step in letter spacing direction to engage the driving wheel 94 of the comma place with the master wheel 12.

*(4) The tens transfer in the column totalizer*

If, owing to the introduction of a value, in the units dollars orders of the column totalizer 1, a tens transfer to the tens dollars orders becomes necessary, this is performed as follows while the value is being introduced:

It is known that the number wheels 10 rotate clockwise in adding operations. When the number wheel 10 of the units of dollars order turns from "9" to "0," one of the tens transfer teeth 140 of the main driving wheel 111 of the units of dollars order, which rotates anti-clockwise strikes a tooth 142 of the receiving pinion 81 of the locking wheel 123, Fig. 13, on the locking wheel lever of the tens place turning the locking wheel 123 one step clockwise. This turning is not interfered with by the Maltese wheel 122 since when the locking wheel 123 is turned, one of the recesses 143 in the flange 121 of the main driving wheel 111 of the units of dollars order is presented to the corresponding tooth 140 of the Maltese wheel.

When the locking wheel 123 of the tens of dollars order is turned through one stop, the main driving wheel 106 of the tens of dollars order is rotated anti-clockwise about the bar 32 since the transmitting gear portion of the locking wheel 123 meshes with the teeth 105 of such main driving wheel. Through the train of gears 145, 146, Fig. 7, which corresponds to the gears 136, 139 a unit is transferred to the number wheel 10 of the tens of dollars order in additive direction. The train gear 147, Fig. 11, of the tens of dollars order is also turned one unit but does not exert any action. To prevent rotation of the twin gear 148 during this idle movement of twin gear 147, due to frictional engagement, means such as a blade spring 149, Fig. 2, in the shape of a comb may be provided, with tongues 150 pressing against each of the twin gears 148, 133, etc., engaged with the accumulator drive gears 262, 244, etc., of the individual orders. After the locking wheel 123 of the tens of dollars order has been moved through one unit, the main driving wheel 111 of the units of dollars order has turned so far that the solid portion of the flange 121 on the main driving wheel 111 is again presented to the Maltese wheel 122 of the locking wheel 123 to provide an interlock.

(5) The operation of the column totalizer when total taking

When it is desired to eliminate the value which has been introduced, by total taking, the following operations occur in the individual orders of the column totalizer, as will now be described for the units place.

When the units of dollars order of the column totalizer has moved into calculating position, the well known total taking key, not shown, is depressed and the releasing finger 19 is turned in the direction of the arrow 93, (Figs. 2-4) turning the locking lever 114 anti-clockwise about the bar 15. This swinging movement of the lever 114 causes the unlocking of the train of gears 111, 136, 151, 130, 137 as described in section (3).

Furthermore the zero stop 57 is shifted in the direction of the arrow 153 in Fig. 5, and moved into the path of the two zero setting teeth 154 on the disk 151 of the zero setting gear 136, Fig. 5.

Now, the master wheel 12 is rotated against the arrow 134 in Fig 1, and the main driving wheel 111 of the units of dollars order and the train of gears 136, 151, 130 and 137 allotted to the units of dollars order are driven in the direction of the arrows 155 in Fig. 3 to reversely turn the numeral wheel 10. At the moment the number wheels 10 of the units of dollars order is turned from "1" to "0," one of the zero setting teeth 154 on the disk 151 of the zero setting gear 136 engages the zero setting stop 57, Fig. 5, and limits the rotation of the said train which now occupies its zero position, as shown in Fig. 2. At this moment, the releasing finger 19 releases the locking lever 114 of the units of dollars order and the parts connected to it, for return into their initial positions, as also described in section (3), and shown in Fig. 2. The zero setting stop 57 is returned into its normal position against the arrow 153 in Fig. 5.

THE ACCUMULATOR

(6) The arrangement of the mechanism in the accumulator

The accumulator 2 is pivoted to rock bodily on the shaft 158 which is secured in an eye 156 of the right-hand side plate 13 and in an eye 157 of the left hand side plate 14, of the column totalizer 1, as best seen in Fig. 19. Inwardly offset bearings 159a and 160a respectively, on the right- and left-hand side plates 159 and 160 of the accumulator 2 are placed on the shaft 158 between the eyes 156 and 157.

Figure 4:
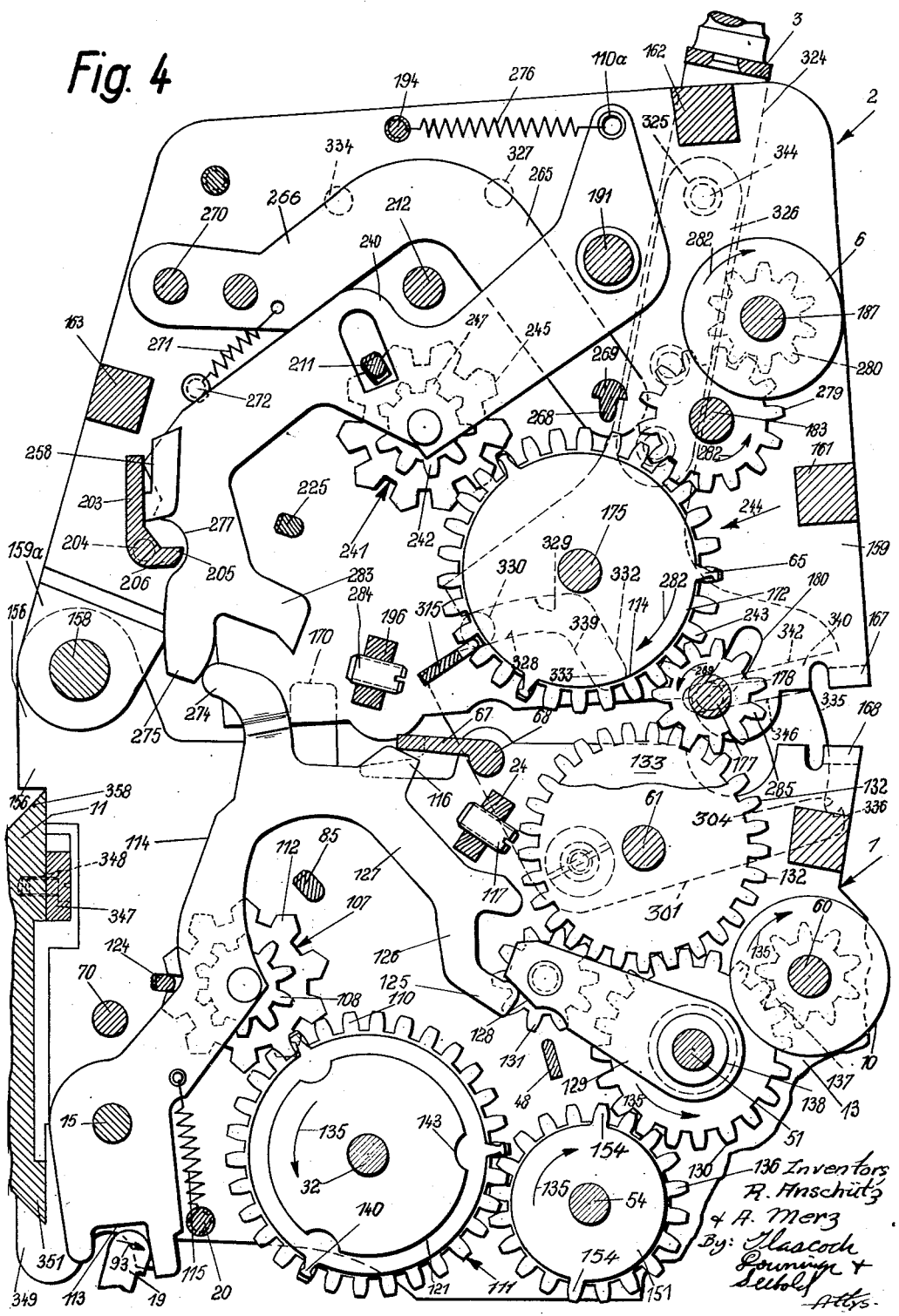

The side walls 159 and 160 of the accumulator 2 are connected by transverse bracing members 161, 162 and 163, Figs. 2, 3 and 4, to which the cover plate 4 is secured by screws 164, Fig. 1.

At the front side of the double totalizer, lugs 167 and 165 on the side plates 159 and 160, respectively, of the accumulator, are arranged for cooperation with abutments 168 and 166 on the respective side plates 13 and 14 of the column totalizer 1, as best seen in Fig. 19. An offset guiding lip 170 projects upwardly from the side plate 13 of the column totalizer 1, and a similar pilot lip 169 is provided on the other side plate 14 as best shown in Figs. 14 to 17 to guide the superposed accumulating section to its seating position on the column totalizer.

In the lowest calculating order, that is, in the hundredths place of the accumulator 2, the following parts are arranged.

The transmission gear 45 (Figs. 5 and 11) of the hundredths order of the column totalizer is arranged for cooperation with the teeth 141 of the hundreds order driving wheel 66 on the shaft 175 of the accumulator. The driving wheel 66 as shown in Fig. 5, is similar to the driving wheel 33 in the column totalizer 1, having three tens transfer teeth 65 and a flange 174 with depressions 173. A reversing pinion 176 journaled on a shaft 177 meshes with the teeth 171 of the accumulator driving wheel 66. The ends 178 and 179 of the shaft 177 are guided in slots 180 and 181 (Figs. 1, 5, and 17) in the side plates 159 and 160, respectively. There are as many reversing pinions on shaft 177 as there are driving wheels, each pinion being constantly in mesh with its respective driving wheel.

Arranged above the shaft 177 is another shaft 183 which is secured in the side plates 159, 160 of the accumulator 2 by screws 182, Fig. 1, on which shaft is journaled an idler gear 184 meshing with the teeth 171 of the accumulator driving wheel 66. This idler gear, through a gear 185, operates the number wheel 6 of the hundredths order of the accumulator 2 shown in Fig. 1. All the number wheels 6 of the accumulator are mounted to rotate about a shaft 187 which is held by screws 186. The arrangement of the numbers on the wheel 6 is shown in Fig. 3, and is similar to that of the numbers on the column totalizer wheels 10.

In the hundredths order of the accumulator 2, a locking tooth 188, Fig 5, on a locking lever 189 engages between the teeth 171 of the driving wheel 66, normally holding the wheel 66 against rotation. The locking lever 189 is mounted to swing about a shaft 191 which is secured by screws 190, Fig 1. A spring 192 which is attached to the upper end of the lever 189 and anchored on a rod 194, pulls the lever against a screw 197 which is adjustable in a fixed cross bar 196, this being the normal position of the locking lever 189. The ends 198 of the bar 196 are inserted in holes 199 of the side plates 159 and 160, and held against turning. Only the hole 199 in the side plate 159 is shown in Fig. 5.

The lower end of the locking lever 189 is provided with a horn 200, the convex face 201 of which is engaged by the tooth 34 of the locking lever 17 already described in section (2).

An incline 202 provided on the back of the locking lever 189 contacts a locking flap 203 extending across the accumulator frame. The flap 203 has a pair of headed trunnions 204, one of which is shown at the right in Fig. 19, mounted to rotate in the side plates 159 and 160. The lower edge of the locking flap 203 is forwardly bent and terminates in a curved face 205 to co-act with a node 208 on the rear edge of the locking lever 189, the curved edge 205 also being capable of entering a recess 209, in the rear edge of the locking lever 189.

A locking bar 211 secured in the side plates 159 and 160 extends, with a clearance, through a slot 210 in the locking lever 189 for engagement by the denominational transfer units of the accumulator.

A shaft 212 is secured in rear of the shaft 191 in the side walls 159, 160 by screws 213, Fig. 1. A locking wheel lever 77, Fig. 5, is mounted to swing about this shaft in the tenths order of the accumulator. A spring 215 anchored on a rod 214 holds an abutment 216 of the locking wheel lever 77 against a screw 217 in the stationary bar 196. A horn 218 at the lower end of the locking wheel lever 77 has a curved front edge 219 for cooperation with a offset lug 76 on the locking wheel lever 71 at the tenths calculating order of the column totalizer, as shown in Fig. 5.

An incline 220 on the back of the locking wheel lever is arranged for cooperation with the locking flap 203, whose curved face 205 can cooperate with the edge 221 of a node 222 on the locking wheel lever 77, or project into a recess 223 in the lever 77.

A locking bar 225, Fig. 2, secured in the side plates 159 and 160 and similar to the transfer unit locking bar 211, extends, with a clearance, through a slot 224 in the lever 77.

A headed rivet 226 is inserted in the lever 77 and supports a tens transfer and locking wheel 227 which will be briefly referred to as the locking wheel and is similar to the locking wheel 82 at the tenths order in the column totalizer 1. The locking wheel 227 comprising a transmitting gear 228, a Maltese wheel 229, and a receiving gear 230, Fig. 11. The teeth 228 of the locking wheel 227 mesh, in the normal position of the lever 77, as shown in Fig. 2, with the teeth 231 of the driving wheel 232 which is allotted to the tenths order and corresponds to the driving wheel 66 of the hundredths place. The Maltese teeth 229 of the wheel 227 rest on the flange 174, Fig. 11, of the driving wheel 66 in the hundredths order, and the other set of teeth 230 can cooperate with the tens transfer teeth 65 of the flange 172 of the wheel 66.

As appears from Fig. 5, a train of gears 233, 234, 235 and 6 is allotted to the tenths calculating order which corresponds to the train of gears of the hundredths calculating order, and so need not be described.

The next higher place is the comma place where no values must be transferred to or from the column totalizer 1. This place is consequently without the train of gears and locking levers of the other orders. The driving wheel 232 of the tenths calculating order, Fig. 11, is connected to the driving wheel 236 at the comma place by rivets 237 for the purpose of any tens transfer which may be required from the tenths order to the units of dollars order. Instead of a number wheel 6, a blank roller 238, Fig. 7, is allotted to the comma place, while a spacer 239, Fig. 5, is arranged on the shafts, 183 and 191.

The parts allotted to the next higher, that is, the units of dollars order, in the accumulator, correspond substantially to those of the hundredths order, but the locking lever 240 of the units order is equipped with a locking wheel 241, like that allotted to the tenths order. The transmitting teeth 242 (Fig. 2) of this locking wheel 241 mesh with the teeth 243 of the driving wheel 244 of the same order, its Maltest wheel 245 is arranged to cooperate with the flange 246 of the driving wheel 236 of the comma place, and its receiving teeth 247 cooperate with the tens-transfer teeth 248 of the flange 249 on the comma place driving wheel 236.

The parts which have been described with reference to the hundredths and tenths calculating orders of the accumulator 2, are also allotted, alternately units of dollars to the tens, hundreds etc. calculating orders in the accumulator, and will not be detailed.

Mounted to swing on the shaft 191 at the left-hand side of the locking wheel lever 240 at the units of dollars order of the accumulator 2 is a three-armed lever 250. A tooth 251 at the rearwardly extending end of the arm 252 of this lever engages in a notch 253 in the flap 203 and is arranged to cooperate with an arm 254 of a member 255 which is fixed to the flap 203 behind the notch 253. A spring 257 connected to another arm 256 of the lever 250 and anchored on the rod 194 turns the lever anti-clockwise and causes its tooth 251 to swing the flap 203 clockwise through the arm 254 of the member 255 until the flap bears on the inclines 258, 220 of the respective locking and locking wheel levers 189 and 77, and this defines the normal positions of the flap 203 and of the three-armed lever 250. In this normal position, a tooth 260 at the free end of the depending third arm 259 of the lever engages between the teeth 261 of the driving wheel 262 at the tens order to take up or compensate for the slack resulting from the cooperation of the driving wheels 66, 232 etc., and the locking and tens transfer wheels 227, 241 etc. which increases from order to order.

A tooth 263 projects from the rear edge of the arm 252 of the three-armed lever 250 for cooperation with a cross rod or stay 264 in a rockable locking frame 265 (Fig. 2). This bail, as best seen in Fig. 17, comprises a pair of arms 266 and 267, the rear ends of which are mounted to swing about a shaft 270 secured to the side plates 159 and 160 of the accumulator 2. The front ends of the bail arms support a detent rod 269 which has the profile of a tooth and extends over the accumulator driving wheels 66, 232 etc., of all denominations in the accumulator, for preventing unintentional rotation of the driving wheels. Each arm of the bail 265 is equipped with a spring 271, as shown for the arm 266 in Figs. 3, 4 and 17 which is secured to the adjacent side plate 159 or 160 by a pin 272. The springs turn the bail 265 clockwise and hold the profiled rod 269 between the teeth 171.

The three-armed lever 250 and the parts 253 and 255 which are cooperating with it, are also arranged at the left-hand side of the thousands denomination in the accumulator 2.

*(7) The operation of the mechanisms when total taking in the column totalizer and transferring the value to the accumulator additively*

The operation of the parts allotted to the individual calculating orders of the accumulator 2 is the same in each order, and so only the operation at the units of dollars order of the accumulator 2 will be described in detail.

In their initial positions, the locking levers 240 and the locking wheel levers 77, through their locking wheels 227, 241 etc. (Fig. 11), prevent rotation of the corresponding accumulator driving wheels 232, 244 etc., in the same manner as described for the locking of the wheels 82, 107 etc. of the column totalizer 1 in section (3).

When it is desired to withdraw a value which has been introduced into the units of dollars order of the column totalizer 1, from the totalizer by total taking, and, at the same time, to transfer this value additively into the accumulator 2, the manipulating handle 3 (Figs. 1-4 and 14-17)—whose arrangement and operation will be described in section (14)—is thrown over from the uncoupling position in Figs. 2 and 14 into the coupling position in Figs. 3 and 15. The accumulator 2 is swung bodily clockwise about the shaft 158 until the lugs 167 and 165 on the side plates 159 and 160 of the accumulator 2 bear on the abutments 168 and 169 on the side plates 13 and 14 of the column totalizer 1. The driving wheels 66, 232 etc. of the calculating orders in the accumulator 2 now mesh with the corresponding transmission wheels 45, 273 at the corresponding calculating orders in the column totalizer 1.

When the column totalizer 1 shifts axially with the supporting bar 11 of the paper carriage to engage its units of dollars driving gear 111 (Fig. 5) with the master wheel 12, the locking lever 114, as described in section (3), is turned anti-clockwise by the releasing finger 19 about the bar 15, as shown in Fig. 3, and its nose 274 acts on the nose 275 at the lower end of the locking wheel lever 240 at the units of dollars order of the accumulator 2, swinging the lever 240 clockwise about the shaft 191 against its spring 276. The incline 258 on the rear edge of the locking lever turns the flap 203 anti-clockwise and the front lower edge 205 of the flap 203 engages in the recess 277 in the locking lever 240 while at the same time it engages the nodes 207 or 221 of the other locking levers 189 and locking wheel levers 77 which are in their normal positions, and blocks them against unintentional turning. At the same time, through the noses 200 and 34 and 218 and 76, the locking and locking wheel levers 17, 71 in the column totalizer 1 are held against unintentional movement, that is, while an operation is performed in the units of dollars order of the column totalizer and the accumulator, all other denominational locking devices are locked against operation.

When the flap 203 (Fig. 5) is turned, the arms 254 of its members 255 act on the ends 251 of the three-armed levers 250 which, as viewed from the left and the front of the column totalizer 1 (Fig. 5) are arranged at the left of the fourth and eighth orders of the accumulator 2, and turn such levers clockwise about the shaft 191 against their springs 257 to disengage the teeth 260 of the three-armed levers from the teeth of the driving wheels 262 and 278 at the fifth and ninth orders. In Fig. 5 only one of said levers 250 is illustrated.

A short time before the three-armed levers 250 have completed their disengaging movement, their teeth 263 collide with the cross bar on stay 264, to turn the detent bail 265 anti-clockwise about the shaft 270 against its springs 271 and return the profiled detent rod 269 from the teeth 171, 231 etc. of the driving wheels 66, 232 etc. of the accumulator 2 with its rib 268, to release said gears.

As the locking wheel lever 240 of the units of dollars order in the accumulator 2 moves clockwise about the shaft 191, the Maltese wheel portion 245 of its locking and tens transfer wheel 241 clears the flange 246 of the driving wheel 236 of the comma place, and its teeth 242 clear the teeth 243 of the driving gear 244 in the units of dollars order. The driving gear 244 and its train 279, 280 and units of dollars numeral wheel 6 are now ready for the reception of a value.

When the locking wheel lever 114 of the units of dollars order in the column totalizer 1 turns anti-clockwise, its fork 126 turns the allotted coupling arm 129 clockwise about the hub 138 of the intermediate gear 130, and the wide coupling gear 131, as described in section (3), connects the pair of transmission gears 132 and 133 allotted to the units of dollars order.

The value which has been introduced in the units of dollars order of the column totalizer 1 is now withdrawn by total taking, as described in section (5) and, as the master wheel 12 is rotated in the direction of the arrow 281 (Fig. 1), the train of gears 111, 136, 130, 137, and the totalizer number wheel 10 of the units of dollars order rotate in directions 155 indicated in Fig. 3 until one of the zero setting teeth 154 of the flange 151 engages the zero stop 57. In this position the number wheel 10 of the units of dollars order displays "0".

When the intermediate gear 130 of the units of dollars order is turned backwards in the direction of the arrow 155 in Fig. 3, the transmission gear 132 is also turned anti-clockwise, and the coupling wheel 131 which meshes with it is turned clockwise and turns the other transmission gear 133 anti-clockwise. The transmission gear 133, through its teeth turns the driving wheel 244 of the accumulator in the direction of the arrow 282. The driving wheel 244 now transfers the total value to the corresponding number wheel 6 of the accumulator through pinions 279 and 280 which number wheel turns in additive or clockwise direction and indicates the total withdrawn from the numeral wheel of corresponding order of the column totalizer 1.

The releasing finger 19 now releases the locking lever 114 on the units of dollars order in the column totalizer 1 and the lever returns into its initial position, as shown in Fig. 2. At the same time, the nose 274 of the locking lever 114 releases the nose 275 at the lower end of the locking wheel lever 240 at the units of dollars order in the accumulator 2 whose spring 276 returns it into its normal position, Fig. 2, with its abutment bearing against the screw 284 in the stationary bar 196. The incline 258 of the returning locking wheel lever 240 releases the flap 203, and by the cooperation of the arms 254 of the members 255 on the flap 203, with the teeth 251 of the three-armed levers 250, the latter become free to return into their normal positions, Fig. 2 and their teeth 263 clear the cross stay 264 of the detent bail 265 which is now returned into its normal position by the springs 271 turning it clockwise about its shaft 270, and the rib 268 of the detent rod 269 engages between the teeth of the driving wheels 66, 232 etc. and locks them, as shown in Fig. 2.

The teeth 263 of the three-armed levers 250 are so positioned with respect to the cross stay 264 that the rib 268 of the detent rod 269 is already between the teeth of the accumulator driving wheels 171, 231 etc. before the coupling gear 131 is moved clear of the transmission gears 132, 133 owing to the return of the locking lever 114 in the units of dollars order of the column totalizer 1. This prevents overthrowing of the train 244, 285, 279, 280 after the throwing out or disengagement of the coupling wheel 231 from its twin transmission gears.

In the locking position of the detent bail 265, Fig. 2, the rib 268 of its detent rod 269 exactly aligns the number wheels 6 displayed through the slot 5 in Fig. 1.

When the flap 203 has returned into its initial position its inner side again engages the inclines 258, 202 and 220 of the locking levers 189, 240 and 77 in the several orders of the accumulator, and its front edge 205 leaves the recess 277 in the locking wheel lever 240 at the units of dollars order and recedes from the edges 207 and 221 of the nodes 208 and 222 of the locking and locking wheel levers 189 and 77 at the other calculating places, releasing the said levers, as shown in Fig. 2.

When the three-armed levers 250 have returned into their normal positions as shown in Fig. 2, their teeth 260 again engage between the teeth of the accumulator driving wheels 262, etc.

When the locking wheel lever 240 at the units of dollars order of the accumulator 2 has returned into its initial position Fig. 2, the teeth 242 of its locking wheel 241 again come into mesh with the teeth 243 of the driving wheel 244 of the units of dollars order and its Maltese wheel 245 again engages the flange 246 of the driving wheel 236 in the comma place, and now all parts of the units of dollars order in the accumulator 2 have returned into the initial positions, shown in Figs. 2 and 5.

When it is desired that when total taking from the column totalizer 1 the value should be transferred to the accumulator 2 subtractively, the handle 3 (Figs. 1–4 and 14–17) is thrown into the position illustrated in Fig. 4 to engage the reversing pinions 285 in the accumulator 2 with the transmission gears 133 of the column totalizer 1. In this case, the train 244, 279 and 280 of the units of dollars order is rotated against the arrows 282 in Fig. 3. The operation need not be described.

(8) *The tens transfer in the accumulator*

The operations which are performed during a tens transfer in the accumulator 2, are substantially similar to the operations described with respect to the column totalizer 1 in section (4), and will therefore not be described.

It should be noted, however, that a rotation of the driving wheel 262 in the tens of dollars order of the accumulator 2 in combination, for instance, with a tens transfer from the units of dollars order to the tens of dollars order in the accumulator 2, and the corresponding rotation of the mating transmission wheel 286 (Fig. 7) at the tens of dollars order of the column totalizer 1 does not influence the tens of dollars calculating order in the column totalizer since the not illustrated locking wheel lever of the tens of dollars order which corresponds with the lever 71 is not swung by the releasing finger 19, and the coupling gear of the tens of dollars order is not coupled with the twin transmission wheels 287, 286 of the tens of dollars order. Hence the transmission gear 287 turns idly with respect to transmission gear 286. In order to obtain an effective tens transfer in the accumulator 2, it was necessary to provide a pair of transmission wheels 44, 45 and 273, 288 etc. for each driving wheel 66, 232 etc.

(9) *The additive introduction of a value into the column totalizer and the additive transfer to the accumulator*

When an accounting problem requires the additive introduction of a value into the column totalizer 1 and an additive transfer of this value into the accumulator 2, the manipulating lever 3 is moved clockwise from its Fig. 14 position into the position illustrated in Fig. 16. The reversing pinions 176, 233, 285 etc. in the accumulator 2 engage with the transmission gears 45, 273 etc. in the column totalizer 1 in a manner which will be described in section 12. Since the operations in the column totalizer 1 have already been described in section 3, this will not be repeated here.

When the locking lever 114 of the units of dollars order in the column totalizer 1 is swung counterclockwise, the parts 107, 129, 131, 67, 101 and 98 operated by it are moved into the positions shown in Fig. 4. At the same time, the nose 274 of the lever 114 acts on the nose 275 of the locking wheel lever 240 allotted to the units of dollars order of the accumulator 2, so that the lever 240 together with the cooperating parts 203, 255, 250, detent fail 265, and locking wheel 241 are moved into the positions shown in Fig. 4.

When the main driving wheel 111 of the units of dollars order in the column totalizer 1 is rotated in the direction of the arrow 135 in Fig. 4, in conformity with the value to be introduced the wheel transfers the value to the corresponding number wheel 10 through gears 136, 130 and 137 which is rotated in the direction of the arrow 135 and indicates the value. When the intermediate gear 130 at the units of dollars order rotates in the direction of the arrow 135, the transmission gear 132, and through the coupling gear 131, the transmission gear 133, are rotated clockwise. The rotation of the transmission gear 133 is transmitted to the reversing pinion 285 of the units of dollars order in the accumulator 2 which turns in the direction of the arrow 289 and rotates the accumulator driving wheel 244 and the train 279, 280 and 6 in the direction of the arrows 282 in conformity with the value to be introduced, whereby this value is transmitted positively to the corresponding number wheel 6 at the units of dollars order in the accumulator 2.

(10) *The introduction of a value into the column totalizer additively and the subtractive transfer to the accumulator*

If the accounting problem requires the additive introduction of a value into the column totalizer 1 and a subtractive transfer thereof to the accumulator 2, the manipulating lever 3 is moved counterclockwise into the position shown in Fig. 15 for connecting the driving wheels 66, 232, 244, etc. in the accumulator 2 to the transmission gears 45, 273 etc. of the column totalizer 1, Figs. 3 and 7. When now the train 111, 136, 130, 131, 137, 10 for example of the column totalizer 1 is rotated in conformity with the value to be introduced, in the direction of the arrow 135 in Fig. 3, the transmission gear 133 is rotated anti-clockwise by the gears 132 and 131. The transmission gear 133 turns the driving wheel 244 which, in turn drives the train 279, 280 and 6 of the accumulator 2 against the arrows 282 to subtractively transfer the value onto the number wheel 6.

(11) The cancellation of the accumulator

The cancellation of a value which has been indicated by the number wheel 6 of the accumulator 2, requires backward transmission of this value into the column totalizer 1 after this has been set to zero by total taking.

The manipulation or state control lever 3 is moved counterclockwise into the position in Fig. 15, whereby the driving wheels 66, 232, 244 etc. of the accumulator 2 are directly connected to the transmission gears 45, 273 etc. of the column totalizer 1.

For instance, if the number wheel 6 of the units of dollars order indicates the value "3" in the accumulator 2, this value "3" is cancelled as follows:

When the units of dollars order of the column totalizer 1 has moved into active position with relation to the master wheel 12, the calculating key for the value "3"—not shown—is depressed for introducing the value "3," the units of dollars order of the column totalizer 1 and of the accumulator 2 are unlocked by the levers 114 and 240, and the train of gears 111, 136, 151, 130, 137 and 10 of the units order in the column totalizer 1 is rotated three steps in additive direction, as shown by the arrows 135 in Fig. 3, the intermediate gear 130 transmitting the value "3" to the twin gear 133 through transmission gear 132 and coupling gear 131. The transmission gear 133 rotates clockwise to drive the train 244, 279, 280 and 6 of the units of dollars order in the accumulator 2 three steps in a direction against the arrows 282. When this rotation has been completed, the number wheel 6 of the units of dollars order in the accumulator 2 again displays a "0," while the number wheel 10 of the units of dollars order in the column totalizer 1 displays "3." This value "3" in the column totalizer 1 is cancelled by total taking in the column totalizer 1, after the manipulating state control lever 3 has returned the accumulator 2 into its initial position, as shown in Figs. 2 and 14.

(12) The arrangement of the coupling and locking means for the accumulator

A headed screw 290, Figs. 14 to 17, is inserted in the left-hand side plate 14 of the column totalizer 1 as the pivot for the left-hand arm 293 of the manipulating lever 3, a bearing 292 in the arm being seated on the shank 291 of the headed screw 290, as shown in Fig. 17. A blade spring 295 is riveted to the arm 293 at 294 and its free end supports a pin 296 sliding in a hole 297 in the arm 293. The inner end of the pin 296 which projects from the hole 297 in the arm 293 is hemispherical for cooperation with three hemispherical depressions 298, 299, and 300 in the left-hand side plate 160 of the accumulator 2, holding the manipulating arm in any one of the three positions.

The lower end of the arm 293 is made with a cam plate 301 whose front edge 302 is curved in ogee form. In the normal position of the manipulating lever 3, Figs. 2 and 14, the high point of the curved front edge 302 engages beneath the end 179 of the reversing pinion shaft 177 which it will be remembered, is mounted to slide in the arcuate slots 180 and 181 in the side plates of the accumulator 2 to hold the pinion shaft 177 against downward movement. At the lower end of the front edge 302, a semicircular seat 304 is formed by the upper edge of a hook 303 in continuation of the front edge 302, which seat engages below the end 179 of the reversing pinion shaft 177 when the manipulating lever 3 is in the position shown in Fig. 15. A slot 305 is formed at the upper end of the front edge 302 along which the end 179 of the reversing pinion shaft is free to slide when the manipulating lever 3 is in the position shown in Fig. 16.

An angular cam slot 307 is formed in the rear portion 306 of the cam plate 301, and into this projects a guide pin 308 secured in the left-hand side plate 160 of the accumulator 2. In the position according to Fig. 15, this pin is in the straight part 310 of the cam slot, and in the position illustrated in Fig. 16 it is in the curved part 309. By the cooperation of the pin 308 and the cam slot 307, a definite position is given to the accumulator 2 which swings about the shaft 158 on the column totalizer 1, for all positions of the manipulating lever 3. A recess 311 is made in the lower edge of the angular slot 307 in its curved portion 309. In the initial position of the manipulating lever 3, as shown in Figs. 1, 14, and 17, an abutment 312, projecting from the left-hand side plate 160 of the accumulator 2 engages in the recess 311. The abutment 312 is the left-hand end of a locking rack 313, as best seen in Fig. 18. The edge 314 of the abutment is curved and, depending upon the direction of movement of the manipulating lever 3 is acted upon by the lower edge 315 of the curved part of the angular slot 307, or with a hook 316 at the upper side of the recess 311.

The locking rack 313 (Fig. 18) is guided in a slot in the left-hand side plate 160 by its abutment 312, and in a similar slot in the right hand side plate 159 by an extension 317. A spring 318 which is attached to a pin 319 in the rack 313 at one end, and to a pin 320 in the side plate 160 at the other end, pulls the rack in the direction of the arrow 321 and a lug 322 on the rack bears against the inner side of the side plate 160 to define the normal position of the locking rack. In this position, the ten teeth 323 of the rack engage between the teeth of the driving wheels 66, 232 etc. in the accumulator 2 and prevent unintentional rotation.

The right-hand arm 324 of the manipulating lever 3 is made exactly like the left-hand one 293, but its cam slot is without the recess 311.

(13) The operation of the coupling and locking means for total taking from the column totalizer and additive transfer to the accumulator For this operation, the manipulating lever 3 is rocked rearwardly into the position shown in Figs. 3 and 15. The arms 293 and 324 turn counterclockwise (as viewed in Figs. 2 and 3) about their headed screws 290. The pins 296 (Figs. 14–17), 325 (Figs. 2 and 3) leave the depressions 298, 327 in the side plates 160 and 159. At first, the curved parts 309, 328 of the cam slots 307, 329 move idly past the guide pins 308, 330 but then their inclined edges 331, 332 engage the pins and the accumulator 2 is swung about the shaft 158 clockwise until the lugs 167 and 165 engage the abutments 168 and 166. In this position, the pins 296, 325 engage in the depressions 299, 334 in the side plates 159 and 160, and the teeth of the driving wheels 66, 232 etc. in the accumulator 2 engage with the transmission gears 45, 273 etc. in the column totalizer 1. The ends 178 and 179 of the reversing pinion shaft 177 are held at the upper ends of their arcuate slots 180 and 181 by the semicircular seats 304.

When the manipulating lever 3 is thus moved anti-clockwise into the position shown in Figs.

3 and 15, the hook 316 of the arm 293 pushes the abutment 312 of the locking rack 313 against the arrow 321 in Fig. 18, so that its teeth 313 clear the teeth of the driving wheels 66, 232 etc. and a tooth space 337 in the rack is presented to each row of the teeth of said driving wheels 66, 232 etc. The driving wheels are now free to rotate when a value is introduced. In the position shown in Figs. 3 and 15, the hook 316 maintains the locking rack 313 at its right-hand limit of travel, to free the accumulator driving wheels for rotation.

When it is desired to uncouple the accumulator 2 from the column totalizer 1, the manipulating lever 3 is returned from its Fig. 3 position into the intermediate position shown in Figs. 2 and 14. First, the pins 296, 325 leave the depressions 299, 334 in the side plates 159 and 160 and the inclined edges 338, (Fig. 17) 339 (Fig. 4) of the cam slots 307, 329 in both arms engage the guide pins 308, 330 and return the accumulator 2 into its normal position by swinging it anti-clockwise about the shaft 158 and the pins 308, 330 are now again in the curved parts 309, 328 of the cam slots 307, 329. At the same time, the hook 316 of the arm 293 releases the rack 313 and the spring 318 again forces the lug 322 of the rack against the inner side of the side plate 160. The teeth 323 of the rack again lock the accumulator driving wheels 66, 232 etc. through their teeth. The pins 296, 325 engage in the depressions 298, 327 and the teeth of the driving wheels 66, 232 etc. in the accumulator clear the transmission gears 45, 273 etc. of the column totalizer 1.

(14) *The operation of the coupling and locking means for total taking from the column totalizer and subtractive transfer to the accumulator*

For this operation, the manipulating handle 3 is moved forwardly into the position in Fig. 16. The pins 296, 325 leave the depressions 298, 327 and the curved edges 302, 335 of both arms 293 and 324 clear the ends 178 and 179 of the reversing pinion shaft 177, until the upper edges 341 342, of the slots 305, 340 act on the reversing pinion shaft 177 whose ends 178 and 179 now descend in the direction of the arrow 343 in Fig. 16. As the shaft 177 descends the reversing pinions 176, 233 etc. of the individual orders which are free to rotate on the shaft, roll on the teeth of the driving wheels 66, 232 etc. and, when the manipulating lever 3 has completed its stroke, mesh with the transmission gears 45, 273 etc. in the column totalizer 1.

As the manipulating handle 3 moves into the position in Fig. 16, the curved portion 309, 328 of the cam slots 307, 329 slide idly past the guide pins 308, 330 in both side plates 159 and 160 without shifting the accumulator frame. The hook 315 of the arm 293 pushes the rack 313 against the arrow 321 (Fig. 18) and its teeth 323 clear the teeth of the accumulator driving wheels 66, 232 etc. The pins 296, 325 engage in the depressions 300, 344 of the side plates 159 and 160.

When the manipulating lever 3 is returned into the idle position in Fig. 14, the edges 345, 346 of the slots 305, 340 raise the shaft 177 against the arrow 343 (Fig. 16) so that its pinions 176, 233 etc. are moved clear of the transmission gears 45, 273 etc. roll on the teeth of the driving wheel 66, 232 etc. and return into their idle positions. The curved edges 302, 335 of the arms 293 and 324 again engage the ends 178 and 179 of the shaft 177 and hold it in its idle position. The hook 315 of the left-hand arm 293 releases the rack 313 which, returning in the direction of arrow 321, locks the driving wheels 66, 232 etc. The pins 296, 325 engage in the depressions 298, 327 in the side plates 159 and 160.

If it is desired to transfer additively to the accumulator 2 a value additively introduced into the column totalizer 1, the manipulating lever 3 is moved into the position according to Figs. 4 and 16, and the operations which have been described above for negative transfer are repeated.

On the other hand, if it is desired to transfer subtractively to the accumulator 2 a value which has been introduced additively into the column totalizer 1, the manipulating handle 3 is moved into the position shown in Figs. 3 and 15, and the operations described in section 13 are performed.

(15) *The suspension and securing means for the double totalizer*

The side plates 13 and 14 of the column totalizer 1 are equipped with integral stationary hooks 350 and 349, respectively, as best seen in Fig. 19, at their lower rear ends which engage the lower edge 351 of the dove-tailed rail 11. For suspending the column totalizer 1 from the rail, the following arrangement is provided.

A suspension bar 352 which is shown partly broken away in Fig. 19, and having a hook-shaped ridge 357 at its free end for engaging the upper edge 358 of the rail 11, as shown on larger scale in Fig. 2, is mounted to swing between the side plates 13 and 14 of the column totalizer 1 by means of trunnions 353 and 354 in holes 355 and 356 in the respective side plates 13 and 14.

For securing the column totalizer 1 against lateral displacement on the rail 11, a catch 359 is mounted on the trunnion 353 and rigidly connected to the suspension bar 352. The rear end of the catch is forked, forming a hook 360 which bears on the upper edge 358 of the rail 11 and a tooth 361 for engaging between the teeth of the rack 347 to secure the column totalizer 1 against lateral displacement. A stud 362 extends between the suspension bar 352 and the catch 359 to which is attached a spring 364 whose lower end is secured to a pin 363 in the right hand side plate 13. This spring tends to turn the bar 352 clockwise, forcing the ridge 357 of the suspension bar and the hook 360 of the catch 359 against the upper edge 358 of the rail 11.

A cam 366, Fig. 20, at the lever edge of the catch 359 is provided for cooperation with a pin 367 of a locking arm 368 which pin extends through an arcuate slot 369 in the right-hand side plate 13. The locking arm 368 is fulcrumed about a headed screw 370 in the side plate 13 and its movement is limited by the ends 371 and 372 of the slot 369.

A lug 373 which extends upwardly from the front end of the catch 359 is arranged for cooperation with a nose 375 of a bellcrank 374 which is mounted to turn about the hinge shaft 158. A torsion spring 377 is wound about the shaft 158 and its longer arm 378 engages in a recess 379 in the transverse stay 163 of the accumulator 2, as best seen in Fig. 2. This spring tends to turn the bellcrank 374 anti-clockwise about the shaft 158 and forces the nose 375 against the lug 373 of the catch 359. The strength of the spring is just sufficient for holding the nose and lug engaged, but it cannot turn the catch 359 anti-clockwise against the spring 364.

A tooth 382 on the bellcrank 374 is arranged for cooperation with the accumulator lock controlling flap 203, and a handle 383 on the bellcrank projects through a slot in the cover plate 4 of the accumulator.

(16) The operation of the suspension and securing means

When it is desired to remove the double totalizer from the rail 11, the locking lever 368 is turned clockwise from the locking position in Fig. 21 into the unlocking position in Fig. 20 in which the pin 367 is against the end 372 of the slot 369. The pin now clears the lower edge 366 of the catch 359. By means of the handle 384, the bellcrank 374 is now turned anti-clockwise and its nose 375, through the lug 373 on whose upper edge it acts, turns the catch 359 and the suspension bar 352 anti-clockwise about the trunnions 353 and 354. The ridge 357 of the bar 352 and the hook 360 now clear the upper edge of the suspension rail 11, and the tooth 361 of the catch 359 clears the rack 347, so that the double totalizer can now be removed.

When the handle 383, 384 is released, the suspension bar 352, the catch 359, and the bellcrank 374 are returned into their normal positions by the spring 364, and the tooth 382 of the bellcrank 374 turns the flap 203 anti-clockwise (Fig. 2) about its trunnions 204 and its edge 205 is placed against the edges 207, 221, 258, etc., of the levers 189, 77 etc. in the totalizer 2, so that unintentional turning of the wheels in the column totalizer 1 and the accumulator 2 is prevented.

(17) Placing the double totalizer on the suspension rail

When it is desired to place the double totalizer on the suspension rail 11, the handle 383, 384 is pressed, the column totalizer 1 is placed on the rail, and the handle is released. Spring 364 now turns the suspension bar 352 and the catch 359 clockwise, the ridge 357 and the hook 360 again engage the upper edge of the rail 11, and the tooth 361 engages between the teeth of the rack 347. The bellcrank 374 returns into the position shown in Fig. 20. The locking arm 368 is now turned anti-clockwise into its locking position, Fig. 21, in which its pin 367 bears against the end 371 of the slot 369. The pin 367 raises the catch 359 by its cam 366 and the upper edge 358 of the rail 11 is firmly engaged by the ridge 357 and the hook 360.

Having now particularly described and ascertained the nature of our said invention, and in what manner the same is to be performed, we declare that what we claim is:

1. In a typewriting-accounting machine, the combination with a plurality of totalizers, each including a plurality of denominational totalizer wheels; and means to actuate the wheels of one of said totalizers, denomination by denomination, said totalizer and said actuating means being relatively shiftable axially; of a pair of parallel, relatively disconnected transmission members adjacent each denominational wheel of said last-named totalizer, one member of each pair of transmission members being connected with its associated denominational totalizer wheel, means to couple the remaining member of each pair of denominational transmission members with the corresponding denominational wheel of a second totalizer at will; and means to releasably couple the respective pairs of transmission members, one pair after another preliminary to the actuation of the corresponding totalizer wheel.

2. In a typewriting-accounting machine, the combination with a master wheel; and a series of denominational gear trains successively engageable with the master wheel, said totalizer and said actuating means being relatively shiftable axially, each gear train including an intermediate gear; of a pair of parallel transmission gears for each denominational gear train, the members of each pair being relatively disconnected, and one member of each pair engaged by the intermediate gear of its associated denominational gear train; a second series of denominational gear trains, corresponding denominationally with the first-named series; means to releasably connect the remaining member of each denominational transmission gear with its corresponding denominational gear train of said second series; and means to releasably couple the individual members of each pair of transmission members for simultaneous and identical rotation, one pair after another preliminary to the actuation of the corresponding totalizer wheel.

3. In a typewriting-accounting machine, the combination with a master wheel; denominational trains of gears successively engageable with the master wheel; and releasable locking means individual to each gear train; of a pair of transmission gears associated with each denominational train; the members of each pair of transmission gears being relatively disconnected, and one member of each pair being engaged with its associated denominational gear train; a superposed denominational gear train corresponding denominationally with the first-named denominational gear train; means to releasably engage each second-named denominational gear train with the remaining transmission gear of the corresponding denominational pair of transmission gears; a coupling pinion individual to each pair of transmission gears; and means controlled by the releasable locking means to effect the coupling of that pair of transmission gears associated with the gear train engaged with the master wheel, and the uncoupling of said transmission gears subsequent to the actuation of said gear train by the master wheel.

4. A totalizer, including a plurality of denominational wheels; a pair of relatively disconnected transmission gears associated with each denominational wheel, one member of each pair of transmission gears being connected with its associated denominational totalizer wheel; an accumulator also including a series of denominational wheels, means to effect a relative shifting movement between the accumulator and the pairs of transmission gears to connect the denominational wheels of the accumulator with the other members of the pairs of transmission gears of like denomination; and means to releasably couple the members of each pair of transmission gears.

5. A totalizer, including a series of denominational gear trains; a pair of disconnected transmission gears associated with each denominational gear train, one member of each pair of transmission gears being in mesh with its corresponding gear train; an accumulator also including a series of denominational gear trains; one series of denominational gear trains being bodily shiftable towards and from the other series of denominational gear trains; a normally idle set of reversing pinions connected with one series of denominational gear trains, and shiftable into and out of engagement with said other members of each pair of transmission gears; adjusting means operable when moved in one direction, to engage the bodily shiftable denominational series of gear trains directly with said other members of each denominational pair of transmission gears, said adjusting means, when operated in the opposite direction, being effective to shift the reversing pinions from their normally idle positions into engagement with said other members of each pair of transmission gears; and means to releasably couple the members of each denominational pair of gears.

6. In a typewriting-accounting machine, the combination with a support capable of longitudinal travel; a master wheel; and a totalizer, including a series of denominational wheels, movable axially with the support to connect the denominational wheels successively with the master wheel; of an accumulator movable axially with the totalizer and bodily movable towards and from the totalizer, the accumulator including a series of denominational wheels; a pair of relatively disconnected transmission gears common to and associated with each wheel of like denomination of the totalizer and of the accumulator, respectively; one member of each pair of transmission gears being in train with the wheel of corresponding denomination in the totalizer; means to shift the accumulator bodily towards and from the totalizer to connect the denominational wheels of the accumulator with the remaining transmission gear of corresponding denomination; and means to releasably couple the members of each pair of transmission gears, one pair after another, during the actuation of the totalizer wheel of corresponding denomination by the master wheel.

7. The combination with a totalizer of conventional type, including denominational wheels; of a pair of relatively disconnected transmission gears in parallel relation, for each denominational wheel, one transmission gear of each pair connected to turn with its associated denominational wheel; a second totalizer, including a series of denominational wheels, and mounted for substantially vertical movement toward and from said first-named totalizer; means operable at will to shift the second-named totalizer towards the first-named totalizer to releasably connect the remaining members of each of the pairs of transmission gears with the corresponding wheels of said second totalizer; and means to couple the individual members of each pair of transmission gears.

8. The combination with a totalizer of conventional type, including denominational wheels; of a pair of relatively disconnected transmission gears in parallel relation, for each denominational wheel, one transmission gear of each pair connected to turn with its associated denominational wheel; a second totalizer, including a series of denominational wheels, and mounted for substantially vertical movement toward and from said first-named totalizer; a set of reversing pinions connected with one series of totalizer wheels and shiftable into and out of the space between the two totalizers when the latter are separated; means operable at will to shift the second-named totalizer towards the first-named totalizer to connect the other members of each pair of transmission gears directly with the corresponding denominational wheels of the second-named totalizer, or to shift the set of reversing pinions into and out of the space between the two totalizers, to connect the reversing pinions with said other members of each pair of transmission gears; and means to couple and uncouple the individual members of each pair of transmission gears.

9. The combination with a totalizer of conventional type, including denominational wheels; of a pair of relatively disconnected transmission gears in parallel relation, for each denominational wheel, one transmission gear of each pair connected to turn with its associated denominational wheel; a second totalizer, including a series of denominational wheels, and mounted for substantially vertical movement toward and from said first-named totalizer; a set of reversing pinions connected with one series of totalizer wheels and shiftable into and out of the space between the two totalizers when the latter are separated; means operable at will and shiftable in opposite directions to and from an intermediate position, to shift the set of reversing pinions into and out of engagement with the remaining members of the transmission gears, or to shift the second-named totalizer to directly connect and disconnect the remaining members of the transmission gears with the corresponding totalizer wheels of said second totalizer; and means to couple and uncouple the individual members of each pair of transmission gears.

10. In an adding-subtracting mechanism, the combination with a totalizer, including a series of denominational wheels; and means to differentially actuate the wheels to effect entry of amounts thereinto; of a second totalizer, including a series of denominational wheels, and mounted for substantially vertical movement towards and from the first-named totalizer; a pair of relatively disconnected transmission gears associated with each denominational wheel of the first-named totalizer, one member of each pair of transmission gears being connected to turn with its corresponding denominational wheel of the first-named totalizer; a set of denominational reversing pinions associated with the wheels of corresponding denomination of the second-named totalizer; means to releasably connect the transmission gears of each pair during actuation of its associated denominational totalizer wheel; and means adjustable to a plurality of positions, in one of which it locks the reversing pinions in their idle positions, and shifts the said second-named totalizer to engage its denominational wheels with the remaining members of the pairs of transmission gears of corresponding denomination; in another of which positions said adjustable means operates to lock the second-named totalizer in spaced-apart relation to the first-named totalizer, and shifts the reversing pinions into mesh with said remaining members of each pair of transmission gears of corresponding denomination; and in a third position, the said adjusting mechanism is effective to lock both the second-named totalizer and the reversing pinions disconnected from their transmission gear members.

11. In an adding-subtracting mechanism, the combination with a totalizer, including a series of denominational wheels; and means to actuate the wheels to differential extents; of a pair of relatively disconnected transmission gears associated with each denominational wheel of the totalizer, one member of each pair of transmission gears being connected to turn with its associated denominational wheel; an accumulator, including a series of denominational wheels, the accumulator mounted for substantially vertical movement towards and from the totalizer; a denominational reversing pinion associated with the wheel of corresponding denomination of the accumulator; means to releasably connect the members of each pair of transmission gears during actuation of its corresponding denominational totalizer wheel; a normally effective locking element to prevent rotation of the accumulator wheels; a cam on said locking element; and a common means shiftable to one position to move the accumulator to connect its denominational wheels only with the remaining members of the corresponding denominational pairs of transmission gears; and to a second position, to shift the reversing pinions only into engagement with said remaining members of the corresponding denominational pairs of transmission gears, and to a third position wherein the common means latches both the accumulator and the reversing pinions out of operation; and wiper mechanism on the common adjustable means to co-act with the cam on the locking element to shift the locking element to idle position as the common adjustable member is shifted to its first- and second-named positions.

12. In an adding-subtracting mechanism, the combination with a totalizer, including a series of denominational wheels; and means to actuate the wheels differential extents; of a pair of relatively disconnected transmission gears associated with each denominational wheel of the totalizer, one member of each pair of transmission gears being connected to turn with its associated denominational wheel; an accumulator, including a series of denominational wheels; means to support the accumulator for substantial vertical movement towards and from the totalizer; a denominational reversing pinion associated with each denominational wheel of the accumulator and shiftable into and out of operative engagement with the remaining members of each pair of transmission gears; means to releasably couple the members of each pair of transmission gears during actuation of its corresponding totalizer wheel; a common adjusting means shiftable in opposite directions; means operable by the common adjusting member when shifted in one direction, to move the accumulator towards the totalizer to directly connect the denominational wheels of the accumulator with the remaining members of each pair of transmission gears of corresponding denomination, and to lock the reversing pinions out of operative engagement with said remaining members, and when shifted in the opposite direction, to indirectly connect the denominational wheels of the accumulator with the said remaining members of each pair of transmission gears.

13. In an adding mechanism, the combination with a totalizer, including a plurality of denominational gear trains; means to actuate the gear trains different extents; normally effective locking means individual to each gear train; and releasing means for the locking means; of a pair of relatively disconnected transmission gears associated with each denominational gear train; one member of each pair of transmission gears being engaged with its associated denominational gear train for actuation thereby; an accumulator, including a plurality of denominational gear trains; locking means individual to each denominational gear train of the accumulator, and controlled by the individual totalizer gear train locking means of corresponding denomination; means to support the accumulator for movement in a substantially vertical direction towards and from the totalizer, to engage and disengage the accumulator gear trains with the remaining members of the transmission gears of like denomination; and coupling means to connect the members of each pair of transmission gears during actuation of its corresponding denominational gear train.

14. In an adding mechanism, the combination with a totalizer, including a plurality of denominational gear trains; means to actuate the gear trains different extents; normally effective locking means individual to each gear train; and releasing means for the locking means; of a pair of relatively disconnected transmission gears associated with each denominational gear train; one member of each pair of transmission gears being engaged with its associated denominational gear train for actuation thereby; an accumulator, including a plurality of denominational gear trains; locking means individual to each denominational gear train of the accumulator, and controlled by the individual totalizer gear train locking means of corresponding denomination; means to support the accumulator for movement in a substantially vertical direction towards and from the totalizer, to engage and disengage the accumulator gear trains with the remaining members of the transmission gears of like denomination; coupling means to connect the members of each pair of transmission gears; and means actuated by the individual locking means for the totalizer denominational gear trains to render said coupling means effective during actuation of its corresponding gear train.

15. In an adding mechanism, the combination with a totalizer, including a plurality of denominational gear trains; means to actuate the gear trains different extents; normally effective locking means individual to each denominational gear train; and releasing means for the individual locking means; of an accumulator, including a plurality of denominational gear trains operable by the totalizer gear trains of corresponding denominations; normally effective locking means individual to each denominational gear train of the accumulator, and controlled by the individual locking means of like denomination of the totalizer; a spring-restored member operable under control of any of the locking means for the accumulator gear trains; and a suitably supported aligning bar common to and releasably engageable with the accumulator gear trains to properly center the elements of such gear trains; the aligning bar being operable under control of the spring-restored member to engage and disengage the accumulator gear trains.

ROBERT ANSCHÜTZ.
AUGUST MERZ.